(12) United States Patent
Roberts

(10) Patent No.: US 8,500,364 B2
(45) Date of Patent: Aug. 6, 2013

(54) METHOD AND APPARATUS FOR INSTALLING TIDAL BARRAGES

(75) Inventor: Peter Miles Roberts, Surrey (GB)

(73) Assignee: Verderg Limited, Knaphill (GB)

( * ) Notice: Subject to any disclaimer, the term of this patent is extended or adjusted under 35 U.S.C. 154(b) by 62 days.

(21) Appl. No.: 13/119,409

(22) PCT Filed: Sep. 2, 2009

(86) PCT No.: PCT/GB2009/051104
§ 371 (c)(1),
(2), (4) Date: Jun. 6, 2011

(87) PCT Pub. No.: WO2010/032026
PCT Pub. Date: Mar. 25, 2010

(65) Prior Publication Data
US 2011/0236135 A1    Sep. 29, 2011

(30) Foreign Application Priority Data

Sep. 16, 2008 (GB) .................................. 0816942.7

(51) Int. Cl.
*E02B 9/08* (2006.01)
(52) U.S. Cl.
USPC .......................................................... 405/77
(58) Field of Classification Search
USPC .. 405/75–77; 14/73–78; 290/43, 54; 415/3.1; 60/641.7, 398; 416/85
See application file for complete search history.

(56) References Cited

U.S. PATENT DOCUMENTS

| 6,967,413 B2 * | 11/2005 | Atiya ............................... 290/43 |
| 2005/0285407 A1 | 12/2005 | Davis et al. ...................... 290/54 |
| 2011/0049896 A1 * | 3/2011 | Burger et al. .................... 290/53 |

FOREIGN PATENT DOCUMENTS

| CA | 1 144 381 | 4/1983 |
| CA | 2 366 043 | 6/2003 |
| DE | 38 13 958 | 11/1989 |
| FR | 923.131 | 6/1947 |
| FR | 2 470 195 | 5/1981 |
| FR | 2 792 661 | 10/2000 |
| GB | 2 001 396 | 1/1979 |
| GB | 2 224 059 | 4/1990 |
| GB | 2 415 748 | 1/2006 |
| GB | 2 443 195 | 4/2008 |
| WO | WO03054385 A1 * | 7/2003 |
| WO | 2005/017349 | 2/2005 |
| WO | 2006/055393 | 5/2006 |
| WO | 2008/015047 | 2/2008 |

* cited by examiner

*Primary Examiner* — John Kreck
*Assistant Examiner* — Stacy Warren
(74) *Attorney, Agent, or Firm* — Seed IP Law Group PLLC

(57) ABSTRACT

A method is provided for installing a barrage across a body of water for generating electricity or current flow, the barrage being formed from a series of modules, each of which comprise a base structure carrying a number of substantially vertical pipe structures in a spaced, side-by-side arrangement, and a deck structure extending across the top of the pipe structures and supported by at least two pipe structures, the method comprising: preparing a series of foundation terraces across the bed of the body of water substantially perpendicular to the direction of flow, each foundation terrace providing a substantially flat base on which the base structure of one or more modules on the terraces side by side such that the base section of each module rests on a terrace and the deck structure of each module is located at substantially the same height as that of its neighboring modules.

16 Claims, 8 Drawing Sheets

12a  12b 12  16

METHOD AND APPARATUS FOR INSTALLING TIDAL BARRAGES

BACKGROUND

1. Technical Field

This invention relates to the construction of barrages that can be used to extract energy from tidal or current flows for the generation of electricity.

2. Description of the Related Art

There have been many proposals for using tidal flow or current flow in a body of water for generating electricity as a non-polluting approach to power generation. Such systems have involved the use of a vane which can be caused to oscillate by the flow, a mechanical transmission system converting this into rotary motion. Such systems face problems such as being mechanically complicated, requiring tuned behavior and are often unable to extract energy from other types of motion.

Other systems feature a large underwater propeller analogous to a windmill but for water instead of wind flows. For the swept disc to gain exposure to the maximum incident current energy, the blades have to be very long which in turn requires sophisticated design and materials to accommodate the stresses at the blade root.

Offshore tidal barrages have been proposed to concentrate the incidental energy of a large cross-section of water flow by trapping the flow behind a containing wall and funneling it through turbines of much smaller cross-sectional area, as in a conventional dam. Such barrages, typically across a tidal estuary, are very expensive and environmentally disruptive.

One common problem for all these systems is to address a sufficiently large cross-section of the ocean or other body of water for power generation to be possible on an industrial scale. Furthermore, end or edge effects can make it easier for the flow to go around any structure positioned in the flow to extract energy from it rather than to pass through the energy extraction system. This problem can be lessened by making an installation very large but this in turn can lead to further complexity and expense and may be beyond the limits of current engineering capability.

WO 2008/015047 discloses improved apparatus for converting energy from wave or current flows wherein a series of pipes are arranged such that venturi are defined. Water flow between these pipes causes the venturi to act as pumps drawing water up through the pipes which are fed by a manifolding flow conduit and driving an impeller. The series of pipes are arranged to form arrays with vertical planes which in turn are mounted on the sea bed to form barrages.

BRIEF SUMMARY

This invention seeks to overcome some of the disadvantages outlined above in relation to tidal barrages by providing a modular construction allowing easier installation that has been possible with previous designs. Furthermore end and edge effects are eliminated by installing a barrage across an estuary from bank to bank or across a strait from coast to coast. The invention is based on a modular application of the technology broadly disclosed in WO 2008/015047.

A first aspect of this invention provides a method of installing a barrage across a body of water for generating electricity from tidal or current flow, the barrage being formed from a series of modules each of which comprises a base structure carrying a number of substantially vertical pipe structures in a spaced, side-by-side arrangement, and a deck structure that extends across the top of the pipe structures and is supported by at least two pipe structures, the method comprising:

preparing a series of foundation terraces across the bed of the body of water substantially perpendicular to the direction of tidal or current flow, each foundation terrace providing a substantially flat base on which the base structure of one or more modules can be positioned; and positioning a series of modules on the terraces side by side such that the base section of each module rests on a terrace and the deck structure of each module is located at substantially the same height as that of its neighboring modules.

The construction of a full depth barrage across the entire width of a body of water maintains the bow wave effect by ensuring that the incident flow is directed through the barrage thus eliminating edge losses. Maintenance of the upstream bow wave permits potential energy conversion to power in excess of the Betz limit.

Each foundation terrace is preferably formed from a linear revetment positioned on the bed of the body of water, the method further comprising profiling the bed adjacent each revetment by dredging and/or dumping of material to match its shape.

The base structure of each module can be secured to the foundation terrace by means of grouting.

Each module can be floated into position over its respective foundation terrace and lowered into position by controlled flooding of the module. In one embodiment, the base of each module comprises a manifold and the tube structures connect to the manifold and have a series of holes along their sides through which water can flow during generation of electricity. In this case, the method of installation can comprise temporarily sealing the holes while the module is floated into place and then opening the holes fully once the module is installed.

In a preferred embodiment, the method further comprises forming a lock between two modules so as to allow waterborne vessels to pass through the barrage. The method can also comprise forming a roadway, railway or aircraft landing strip on the deck structure.

Modules can be selected from a set of modules having different heights of deck above the base unit, the module being selected according to the depth of water in which it is to be positioned.

A second aspect of the invention provides a module for use in a method according to the first aspect of the invention, comprising:

a base structure defining a manifold;

an inlet in the manifold housing an impeller that is connected to drive a generator;

a number of substantially vertical pipe structures in a spaced, side-by-side arrangement mounted on the manifold so as to connect thereto, each pipe having a series of holes formed along its side facing its neighboring pipe such that flow between adjacent pipes causes a venturi effect such that water is drawn from the manifold through the holes causing water to be drawn into the manifold through the inlet to drive the impeller; and a deck structure that extends across the top of the pipe structures and is supported by at least two pipe structures.

The generator is typically located at or near the deck structure.

At least some of the pipe structures can terminate below the deck such that, in use, they lie above but close to the normal high water level.

A third aspect of the invention provides a module for use in a method according to the first aspect of the invention, comprising:
  a base structure defining a manifold;
  an inlet in the manifold housing an impeller that is connected to drive a hydraulic pump;
  a number of substantially vertical pipe structures in a spaced, side-by-side arrangement mounted on the manifold so as to connect thereto, each pipe having a series of holes formed along its side facing its neighboring pipe such that flow between adjacent pipes causes a venturi effect such that water is drawn from the manifold through the holes causing water to be drawn into the manifold through the inlet to drive the impeller; and
  a deck structure that extends across the top of the pipe structures and is supported by at least two pipe structures.

The hydraulic pump may be used to drive a high pressure water pump

Further aspects of the invention will be apparent from the following description.

DETAILED DESCRIPTION

This invention is based on the technology broadly disclosed in WO 2008/015047, which describes apparatus for generating electricity using tidal, wave or current flow in a body of water, comprising: an arrangement of first and second pipes, each first pipe being provided with a series of holes spaced along its length, and the first pipes being arranged relative to the second pipes such that a venturi is defined between the walls of adjacent first and second pipes near the holes. A flow conduit is provided having an inlet and an outlet with an impeller located in the flow conduit; and a generator connected to the impeller. Water from the body can enter the flow conduit via the inlet, and the first pipes are connected to the outlet of the flow conduit such that flow of water past the arrangement of first and second pipes causes the first pipes to act as venturi pumps inducing flow from the inside of the first pipes through the holes so as to draw water through the flow conduit and drive the impeller The term 'Spectral Marine Energy Converter' (SMEC) is used to define such technology. The word "Spectral" signifies that energy is extracted from any water movement between the pipes irrespective of the frequency of the incident energy. Most other wave energy devices rely on energy extraction through the device being tuned to resonate at the frequency at which the energy density of the ambient wave spectrum is expected to peak. SMEC, by contrast, is "pan-spectral". It works well even at near-zero frequency, i.e., tidal flows.

The basic principle of the invention is to align a series of SMEC modules across an estuary or straits so as to form a barrage. The SMEC modules are capable of generating electricity from tidal or current flow by driving impeller units via venturis. A second embodiment of the invention is to provide a platform for supporting a road or railway.

Figure 1:
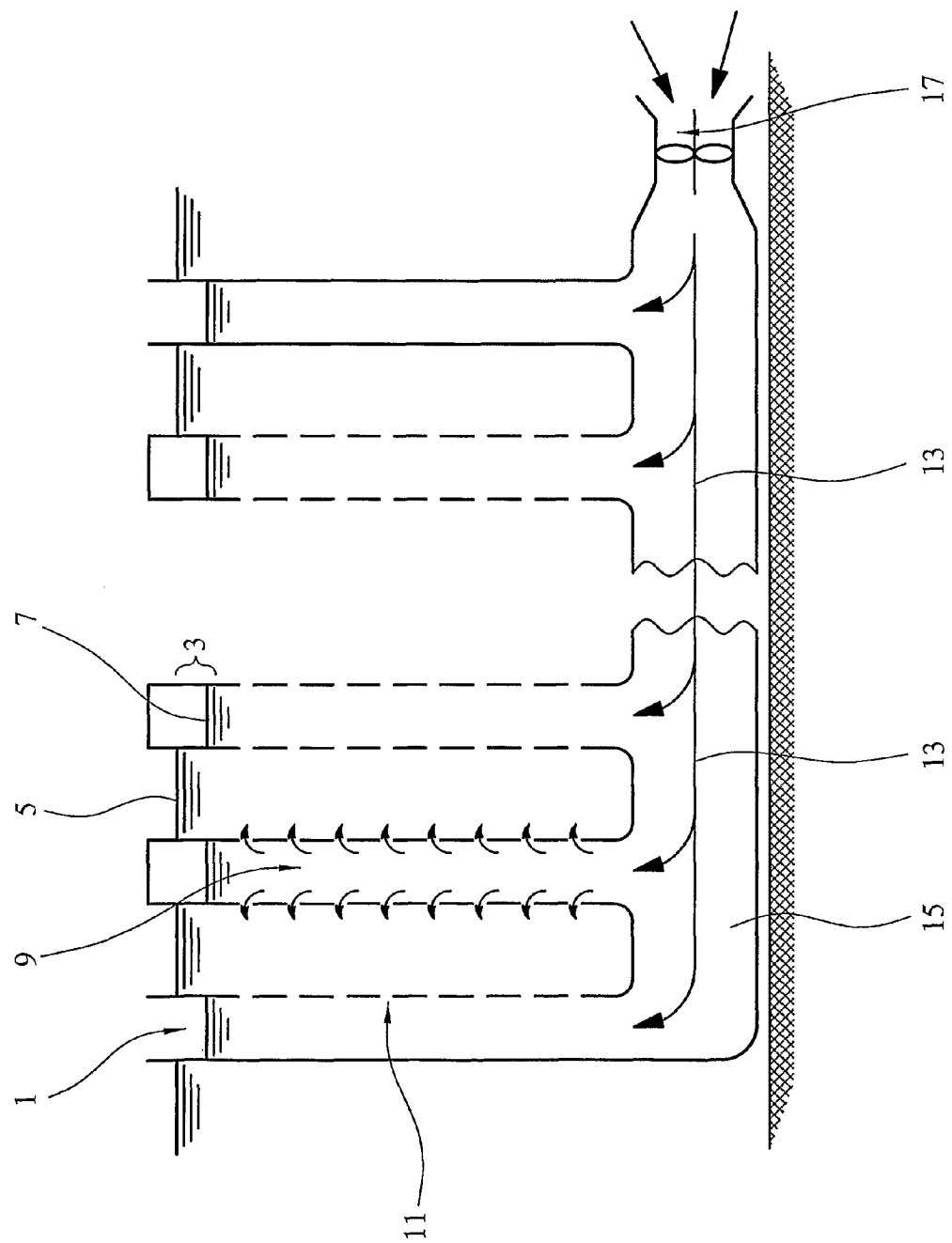
FIG. 1 shows SMEC tubes which are aligned in a series to form a barrage set across a tidal flow.

FIG. 1 shows a series of SMEC tubes 1, which may have open or closed tops, set across a tidal flow. A head drop 3 from the water surface level 5 to the intra-tube water level 7 is caused by a venturi effect. This induces a secondary flow 9 out through the slots 11. This small pressure drop across a very large number of venturi orifices induces a large volume, high cross-sectional area, low velocity secondary flow 13 through the manifold piping 15. This large body of slow moving water is fed by water flowing past the impeller via a shroud 17 of significantly less cross-sectional area to provide a local flow velocity that is higher than that of the manifold. The total cross sectional area of slots 11, manifold piping 15 and shroud 17 are selected to increase the pressure drop and maximize power output in accordance with Bernoulli's Theorem. This design freedom permits the impeller to be optimized to operate at high efficiency and desirable stress levels.

Figure 2:
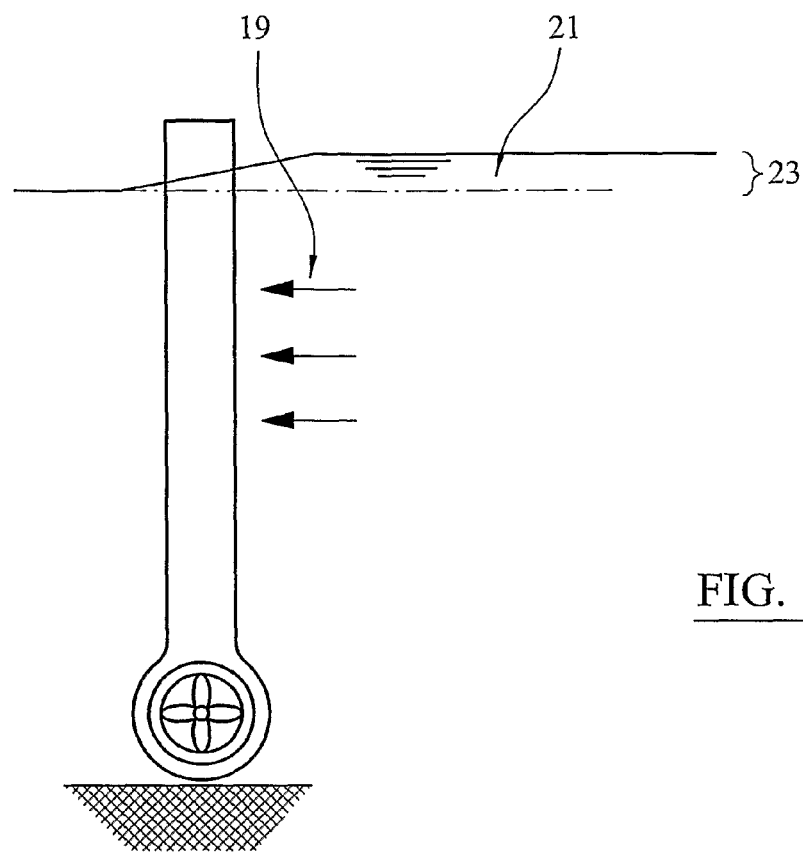
FIG. 2 shows a side view of a SMEC tube.

FIG. 2 shows a side view of a SMEC barrage in operation; the direction of tidal flow 19 is shown. The physical presence of the SMEC barrage causes the upstream water surface level to rise in the manner of a bow wave 21. This bow wave results from the inability of water to flow through the SMEC tube via the slots due to the pressure difference. The resulting head difference 23 permits the conversion of potential energy into useful power above the upper efficiency limit, know as the Betz limit, of a device which extracts solely kinetic energy.

Increasing the physical length of the SMEC barrage maintains the bow wave effect by preventing by-pass losses at the edge of the device whereby the incident flow is diverted around rather than through the barrage. As the height of the bow wave does not scale linearly with the length of the SMEC barrage the quasi-constant energy lost at the edges of the device is amortized over an increasing total energy output. Furthermore a full depth SMEC barrage installed across an estuary from bank to bank or across straits from coast to coast will exhibit zero edge losses as by-pass flow will be eliminated.

Figure 3:
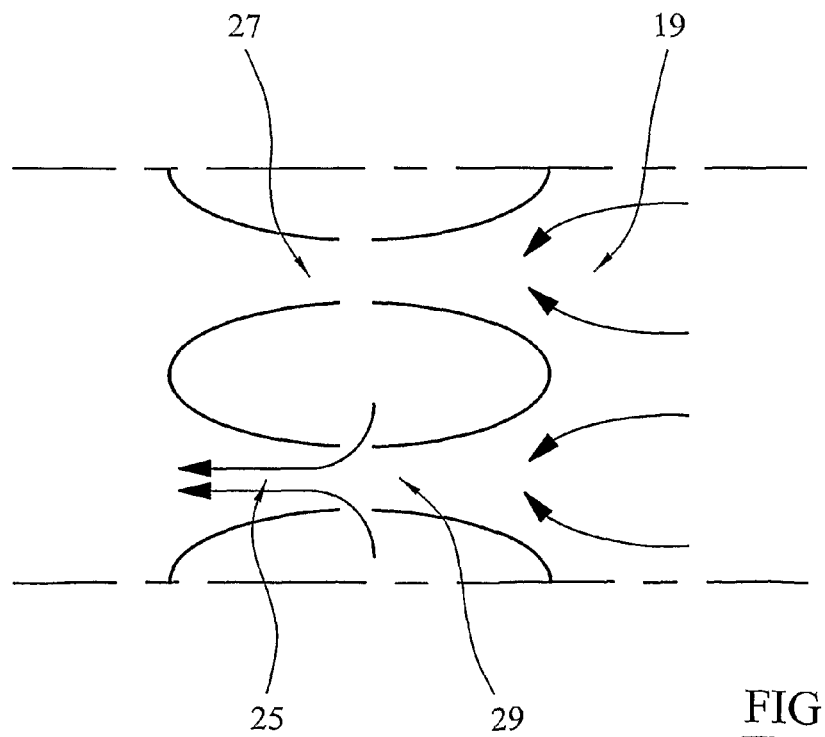
FIG. 3 shows a birds eye view of a SMEC tube.

FIG. 3 shows secondary flow paths 25 induced by low pressure 27. The tidal current 19 flows through venturis 29 and exhibits a pressure drop in accordance with Bernoulli's Theorem.

Figure 4:
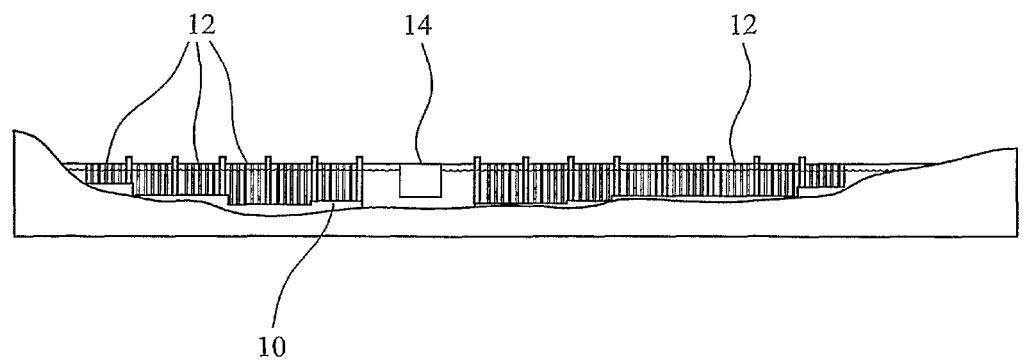
FIG. 4 shows SMEC barrage modules placed end to end to form a barrage across a typical estuary or strait.

FIG. 4 shows a cross section of a typical estuary or straits in which a barrage can be installed. The river bed has been prepared with foundation terraces 10 onto which SMEC barrage modules 12 can placed in an end to end arrangement to form the barrage. The barrage may also incorporate a lock 14 to permit the passage of shipping. The length of the pipes or tubes of each SMEC module 12 are selected to suit the depth of the prepared foundation below the water level with the objective of maintaining the upper parts of the modules at essentially the same height.

The cross sectional area of flow intersected by the SMEC barrage is unlimited by structural strength considerations as is the case with underwater turbines whose size is limited by the stress in the blade or near the blade root. The volume of the induced secondary flow in a SMEC barrage can be made as large as desirable by increasing the size of the SMEC which is infinitely scalable. The tidal stream power converted to electrical power by a SMEC array is therefore also infinitely scalable, the only constraint being the cross-sectional area of tidal flow available to barrage.

Figure 5:
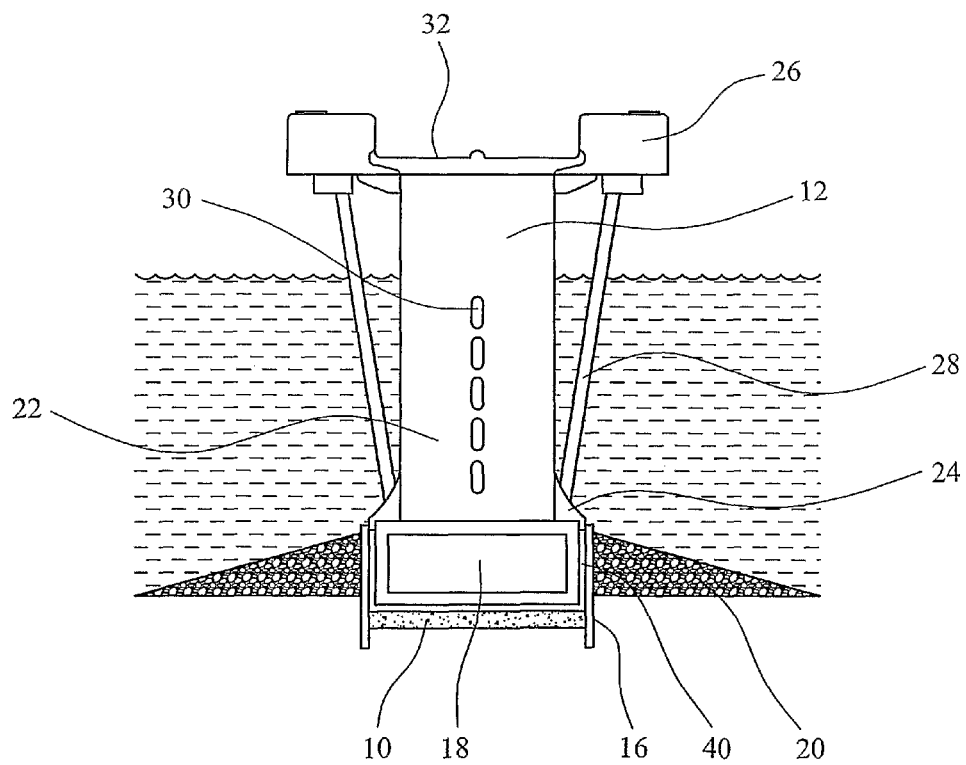
FIG. 5 shows a cross section of a SMEC barrage module.

FIG. 5 shows a cross section of a SMEC barrage module 12 installed on its foundation terrace 10. Each terrace is formed by sheet-piling a linear revetment 16 into the river or sea bed to suit the width of the base section 18. The river or sea bed is profiled by dredging and/or gravel dumping 20 to protect the river bed from erosion and guide flow through the SMEC module.

Each SMEC barrage module 12 is fabricated from concrete and/or steel in a temporary or local dock, so as to be able to take advantage of slip-forming and other cost saving fabrication techniques. The size of each module is typically selected so as to be towable by commonly available tugs in the area of deployment.

The base section 18 of the module 12 defines a manifold from which hollow tube sections 22 extend. An inlet in the base section houses an impeller to define a turbine section 24. The impeller is connected to a generator module 26 located at the top of the module by means of a shaft 28. The tube sections 22 contains slots 30 located below tide level when the module is in place. The impeller is driven by water flow directed through the manifold as a result of water being forced through a series of venturis defined by the adjacent tube section. The increased velocity of water passing through the venturis draws water from the slots 30 which in turn draws water through the inlet and manifold. The impeller in turn drives the impeller shaft 28 which powers the generator 26.

In a further embodiment of the invention the impeller may drive a hydraulic pump. Hydraulic power converted from the secondary flow may be used to drive a hydraulic motor which may be used to drive machinery or to generate electrical power. Incorporating a hydraulic accumulator into the circuit permits the storage of energy as it is converted from the secondary flow. This energy may be later used when required ensuring that energy demands are not dependent on concurrent generation. The same regulatory effect can be achieved by coupling a high pressure water pump to the hydraulic pump. The pumped water can be used to fill an elevated reservoir. When required the water can be used to power a turbine-driven electrical generator powered by hydrostatic pressure. This way the generator is only used when electrical power is needed and the tidal and demand cycles may be completely decoupled.

Paved top segments 32 are located at the top of the SMEC barrage module 12. Once the SMEC barrage modules are aligned end to end these are connected to form a road or railway. These paved top segments 32 additionally serve to aid structural integrity. In further embodiments of the inventions these paved top segments may form large applications such as aircraft runways together with airport terminal facilities. An airport may be located on an artificial island part way across the estuary or straits with its runways at right angles to the SMEC barrage.

Figure 6:
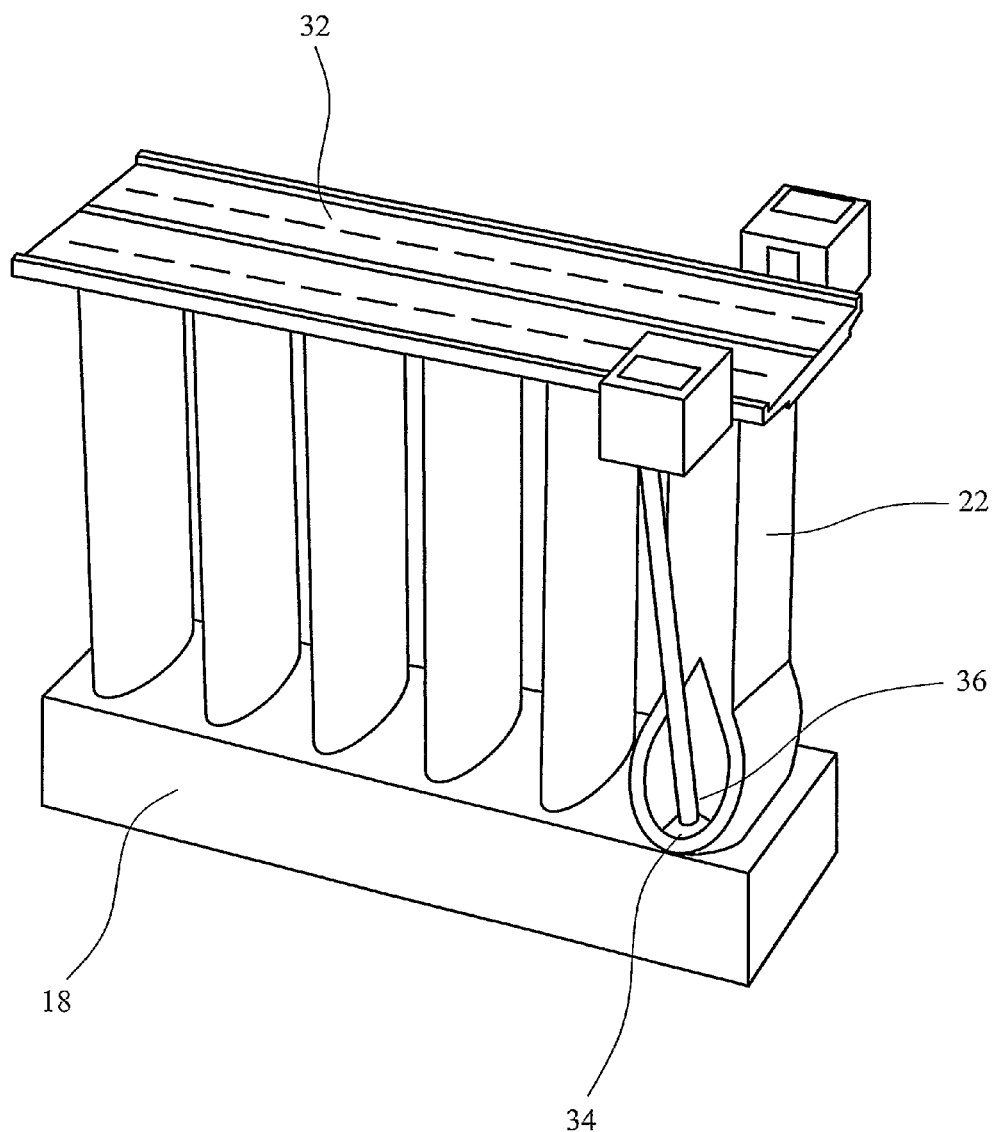
FIG. 6 shows a standard module of a SMEC barrage.

FIG. 6 shows a standard module of a SMEC barrage 12. The heights of the tubes 22 are selected to suit the depth of the prepared terrace foundation below the water surface (the high water level in tidal areas). Water flows out from the venturi slots at the tube mid-chord into the lower pressure region, inducing a secondary flow through the manifold 18, impeller inlet 34 and impellers 36, which drives the generators 26.

Figure 7:
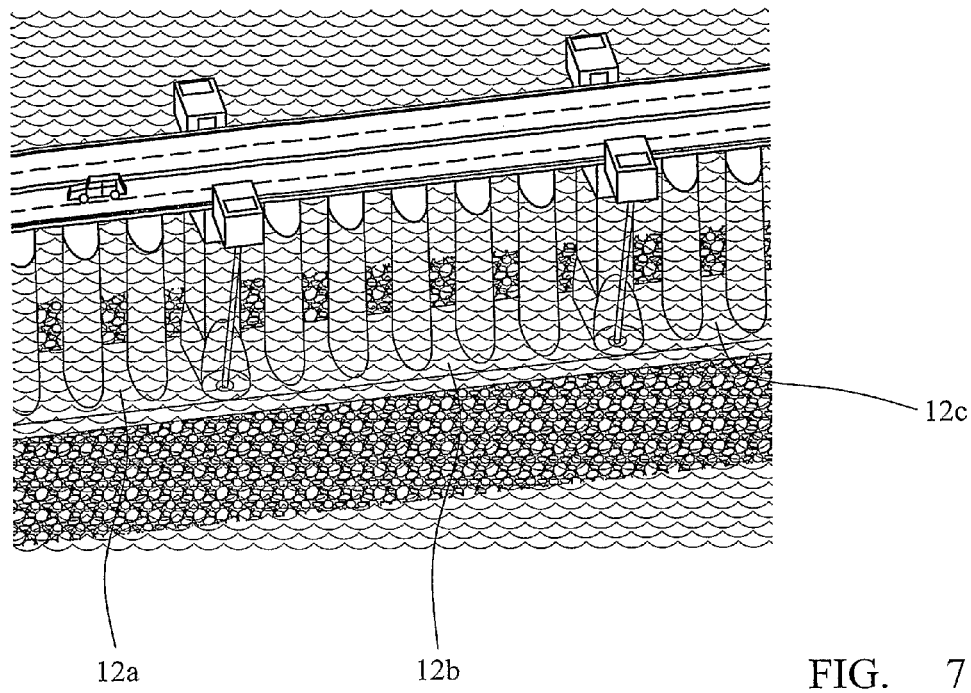
FIG. 7 shows a general view of a SMEC barrage in operation.
Figure 8:
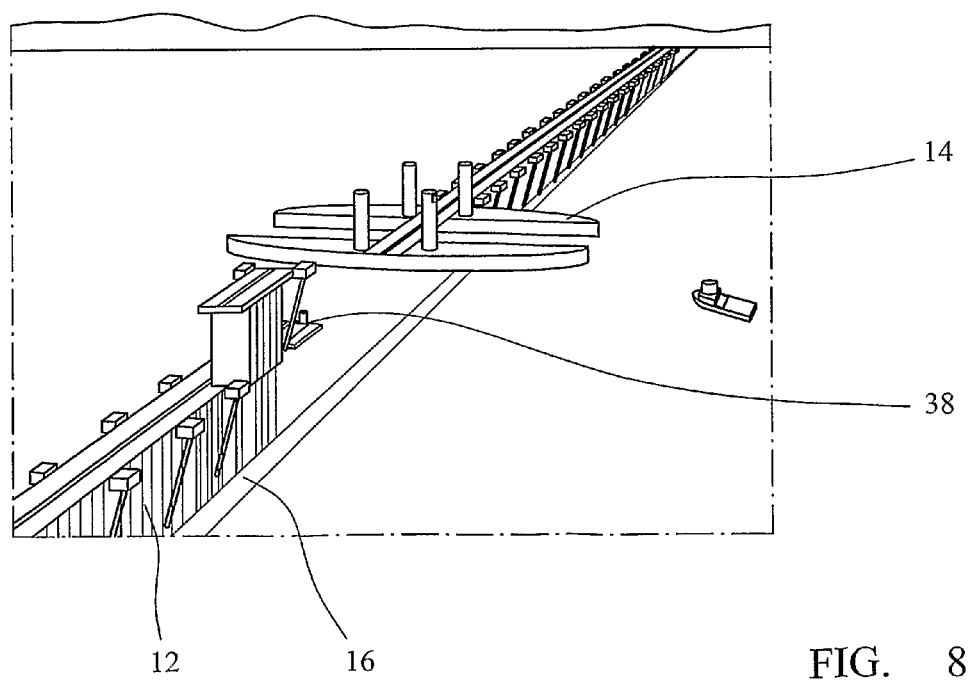
FIGS. 8, 9, 10, 11 and 12 show a SMEC barrage being constructed.
Figure 9:
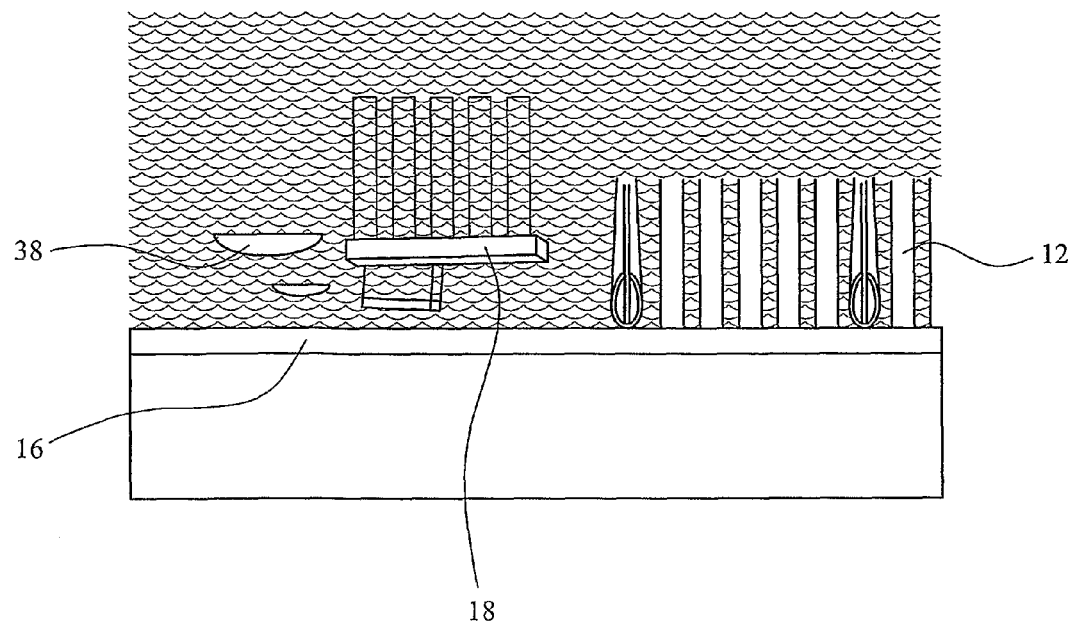
Figure 10:
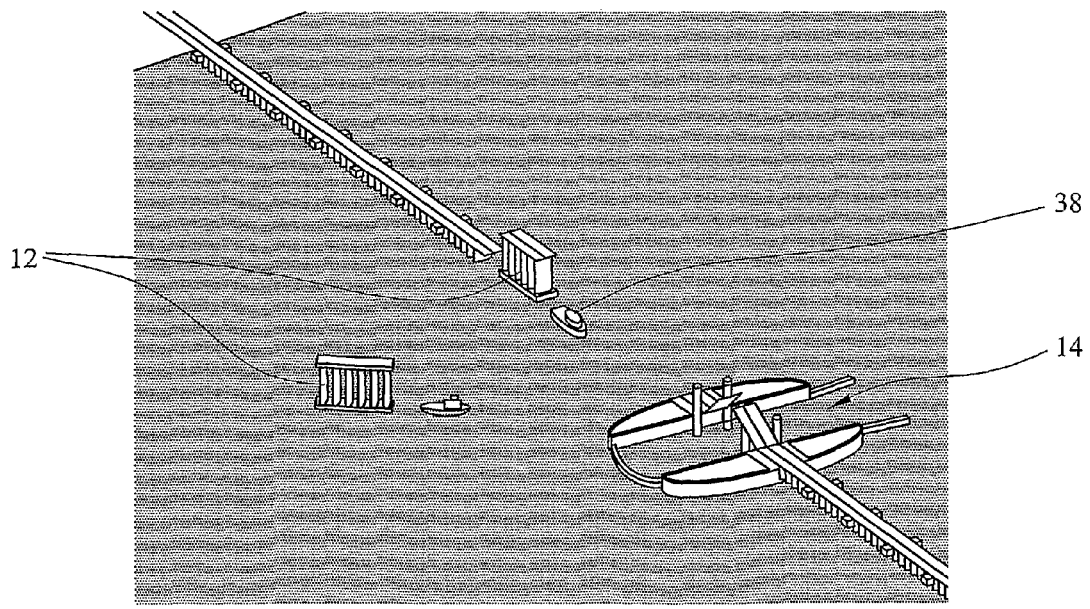
Figure 11:
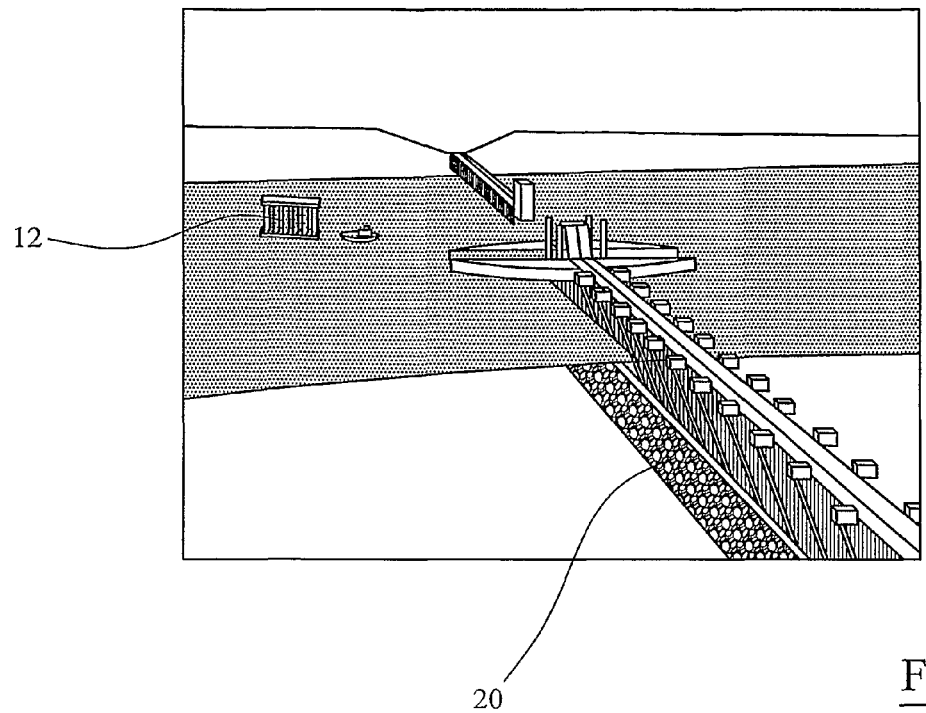
Figure 12:
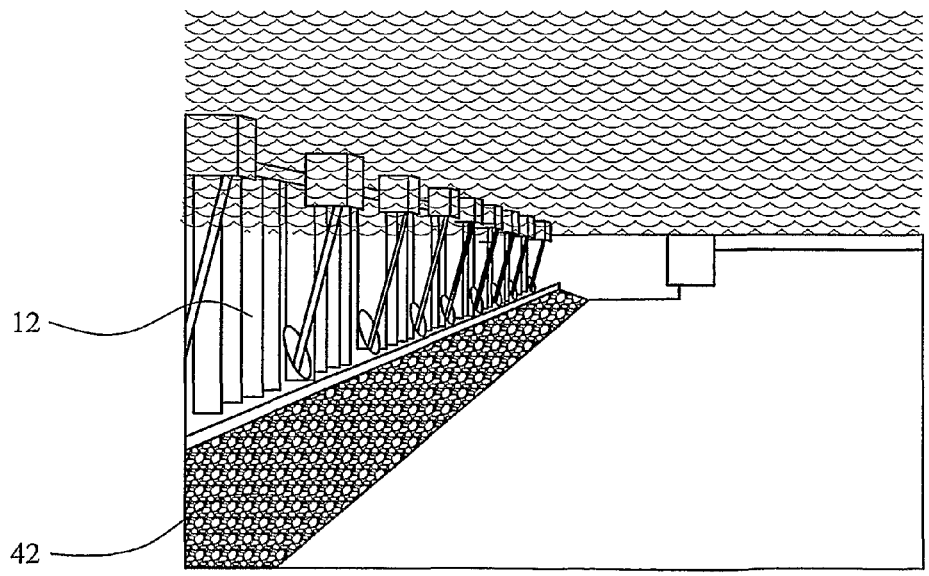

FIG. 7 shows a general view of a SMEC barrage in operation with three modules 12a, 12b, 12c shown. The downstream eco-system is not seriously impacted; as the main effect of the SMEC is a once-only delay in the tidal cycle, whereas a solid barrage changes the shape of the time profile of the tidal cycle.

FIGS. 8, 9, 10, 11 and 12 show a SMEC barrage being constructed. The river or sea bed is profiled by dredging and/or rock dumping and foundation terraces are formed in the river or sea bed by sheet-piling the linear revetments 16 as is described above. The slots 30 of the SMEC barrage modules 12 are temporarily sealed so as to form a buoyant chamber with the manifold (which has closed ends). The modules are towed into position by tugs 38. Once the module is in position over its revetment 16, the module is lowered into place by controlled flooding through appropriate valve-controlled inlets. Alternatively the slots 30 and impeller inlets 34 are unsealed to facilitate controlled flooding of the structure and lowering of the module into place. The module is lowered into place between the pre-driven sheet-piled revetments 16. Once seated in the foundation, any gaps around or underneath of the SMEC barrage modules are sealed with grout 40. The modules 12 need only be joined to one another at road or railway level. When several SMEC barrage modules 12 are in place, a profiled rock ramp 42 is prepared on either side using rock dumping.

Figure 13:
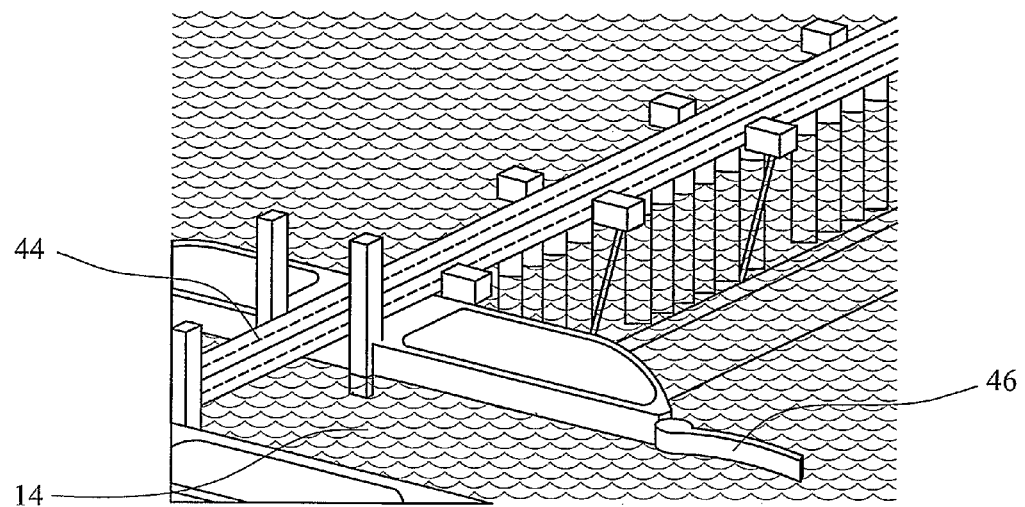
FIG. 13 shows a lock being incorporated into the SMEC barrage.

FIG. 13 shows a lock 14 incorporated into the SMEC barrage to permit the passage of shipping. The lock may incorporate a lift, swing or high level bridge 44 in the road or railway. Lock gates 46 in the closed position can function to increase the flow rate and guide the flow through the SMEC barrage modules resulting in enhanced electricity generation.

Figure 14:
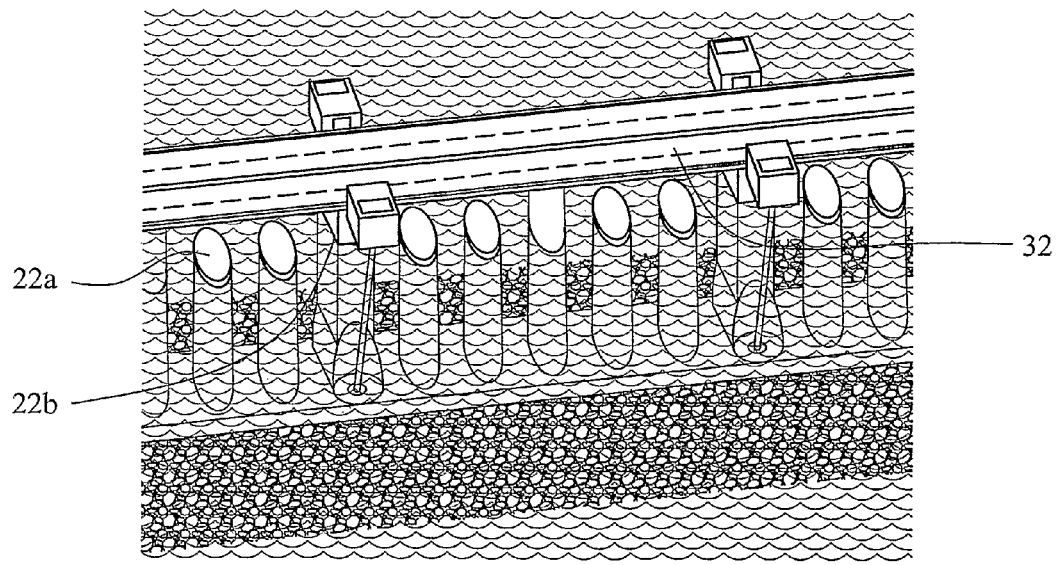
FIG. 14 shows a second embodiment of a module according to the invention.

FIG. 14 shows a further embodiment of the SMEC module in which a number of the tubes 22a are truncated so as to end just above the normal high water level. Other tubes 22b extend to support the deck 32. The truncated tubes 22a permit surges such as storm surges, exceptional tides, bores and flood surges to pass harmlessly over the tubes but under the roadway, limiting both the loads imposed on the module and the upstream flooding effect that might be caused by the barrage restricting flow. The SMEC barrage has the additional advantage of being less environmentally disruptive. The SMEC barrage slightly modifies the upstream tidal cycle rather than completely stopping it by concentrating water behind a containing wall; the method employed by conventional tidal barrages. Furthermore the SMEC barrage is also much lighter and cheaper and is able to withstand the overturning moment of the full tidal range by permitting flow through in both directions and permitting surges to pass unobstructed.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A module for forming a barrage across a body of water for generating electricity from tidal or current flow comprising:
   a base structure defining a manifold;
   an inlet in the manifold housing an impeller that is connected to drive a generator or a hydraulic pump;
   a plurality of substantially vertical pipe structures in a spaced, side-by-side arrangement mounted on the manifold so as to connect thereto, each pipe having a series of holes formed along its side facing its neighboring pipe such that flow between adjacent pipes causes a venturi effect such that water is drawn from the manifold through the holes causing water to be drawn into the manifold through the inlet to drive the impeller; and a deck structure that extends across the top of the pipe structures and is supported by at least two of the pipe structures.

2. A module as claimed in claim 1 wherein the deck structure comprises a roadway, railway or aircraft landing structure.

3. A module as claimed in claim 1 wherein at least some of the pipe structures terminate below the deck.

4. A module as claimed in claim 1 further comprising a generator, wherein the generator is located at or near the deck structure.

5. A module as claimed in claim 1 further comprising a hydraulic pump wherein the hydraulic pump is connected to a high pressure water pump.

6. A barrage for generating electricity from tidal or current flow comprising a plurality of modules according to claim 1.

7. A method of installing a barrage according to claim 6 across a body of water for generating electricity from tidal or current flow, the method comprising:

preparing a series of foundation terraces across a bed of the body of water substantially perpendicular to the direction of tidal or current flow, each foundation terrace providing a substantially flat base on which the base structure of one or more modules can be positioned; and positioning a series of modules on the foundation terraces side by side such that the base structure of each module rests on a foundation terrace and the deck structure of each module is located at substantially the same height as that of its neighboring modules.

8. A method as claimed in claim 7, wherein the barrage is installed across an entire width of the body of water.

9. A method as claimed in claim 8, further comprising maintaining an upstream bow wave to permit potential energy conversion to power in excess of the Betz limit, the upstream bow wave being maintained by a pressure difference across the vertical pipe structures of the barrage.

10. A method as claimed in claim 7, wherein each foundation terrace is formed from a linear revetment positioned on the bed of the body of water, the method further comprising profiling the bed adjacent each revetment by dredging and/or dumping of material to create a ramped profile, such that the tidal or current flow is guided to each module.

11. A method as claimed in claim 7, wherein the base structure of each module is secured to the foundation terrace by means of grouting.

12. A method as claimed in claim 7, further comprising floating each module into position over its respective foundation terrace and lowering it into position by controlled flooding of the module.

13. A method as claimed in claim 12, further comprising temporarily sealing the holes while the module is floated into place and then opening the holes fully once the module is installed.

14. A method as claimed in claim 7, further comprising forming a lock between two modules so as to allow waterborne vessels to pass through the barrage.

15. A method as claimed in claim 7, further comprising forming a roadway, railway or aircraft landing strip on the deck structure.

16. A method as claimed in claim 7, wherein modules are selected from a set of modules having different heights of deck structure above the base structure, the different heights resulting from a variable water level in which the base structure is to be positioned.

* * * * *